(12) United States Patent
Ubagai

(10) Patent No.: US 6,439,335 B1
(45) Date of Patent: Aug. 27, 2002

(54) 4WD TRANSFER MOUNTING CONSTRUCTION

(75) Inventor: Toshikazu Ubagai, Shizuoka-ken (JP)

(73) Assignee: Suzuki Motor Corporation, Shizuoka-ken (JP)

( * ) Notice: Subject to any disclaimer, the term of this patent is extended or adjusted under 35 U.S.C. 154(b) by 0 days.

(21) Appl. No.: 09/535,772

(22) Filed: Mar. 28, 2000

(30) Foreign Application Priority Data

Mar. 30, 1999 (JP) .......................................... 11-088816

(51) Int. Cl.$^7$ .............................................. B60K 17/16
(52) U.S. Cl. ...................... 180/378; 180/245; 180/380; 180/383; 180/384
(58) Field of Search ................................ 180/378, 380, 180/383, 384, 245

(56) References Cited

U.S. PATENT DOCUMENTS

| | | | | |
|---|---|---|---|---|
| 4,770,280 A | * | 9/1988 | Frost ...................... | 180/247 X |
| 4,771,852 A | * | 9/1988 | Nishikawa et al. .......... | 180/247 |
| 5,105,902 A | * | 4/1992 | Wilson et al. ........... | 180/247 X |
| 5,560,447 A | * | 10/1996 | Ishii et al. .............. | 180/247 X |
| 5,655,370 A | * | 8/1997 | Folsom et al. .......... | 180/378 X |
| 5,971,881 A | * | 10/1999 | Jolliff ..................... | 180/378 X |
| 5,984,821 A | * | 11/1999 | Showalter ................... | 180/247 |
| 6,109,408 A | * | 8/2000 | Ikeda et al. ............. | 180/378 X |

* cited by examiner

Primary Examiner—Lanna Mai
Assistant Examiner—Toan C To

(57) ABSTRACT

In the transfer attachment construction of a 4WD vehicle, to facilitate assembly by making the retainer attachment bolts easier to tighten, to improve the coupling reliability of the retainer and mount bracket, to make easier the manufacture of the retainer by simplifying its design, to improve yield, and to make it less expensive, the retainer attachment bolts are prevented from interfering with the bracket attachment bosses. The bracket attachment bosses are disposed close enough to the transfer pinion axle center to avoid overlapping between the bracket attachment bosses and the retainer attachment bolts.

3 Claims, 11 Drawing Sheets

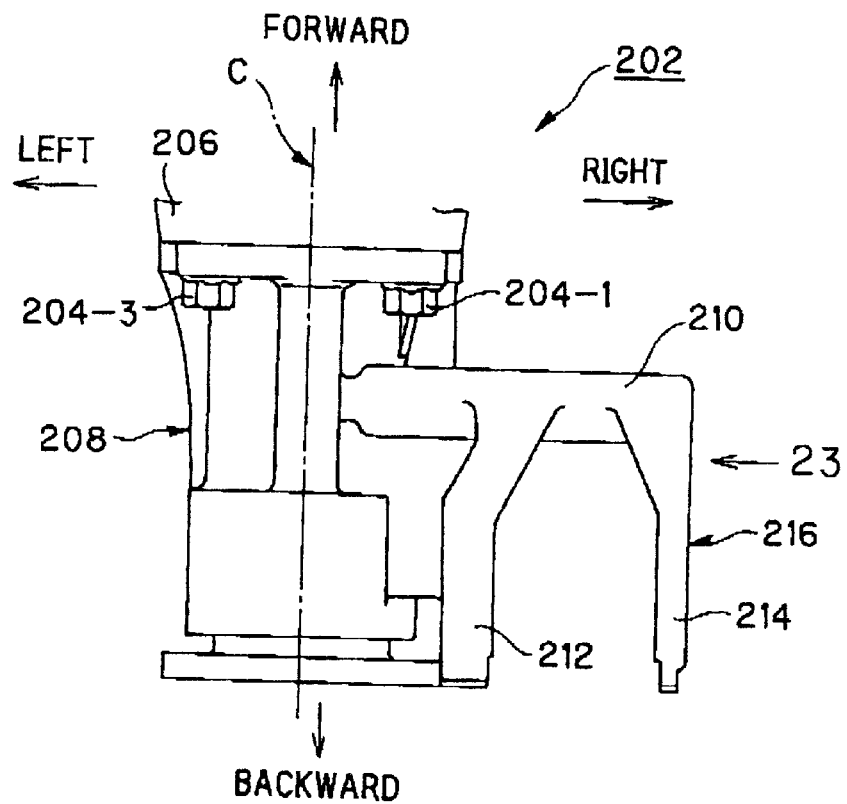
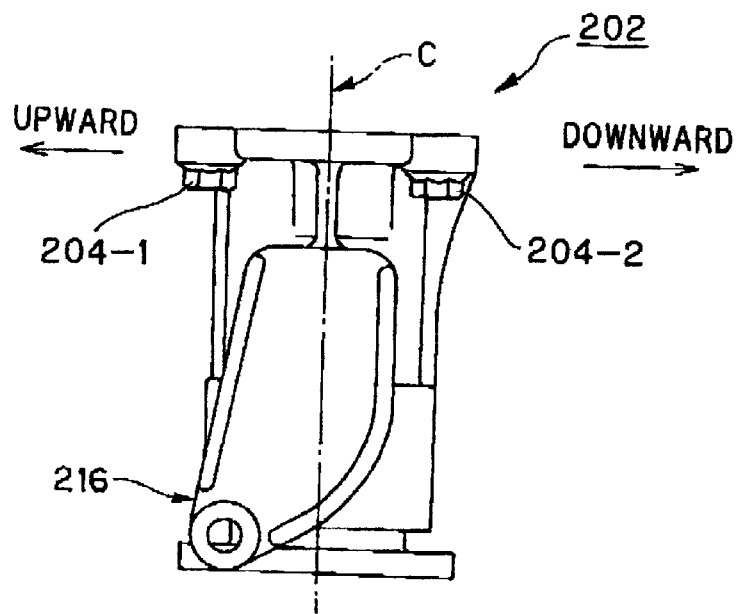

4WD TRANSFER MOUNTING CONSTRUCTION

FIELD OF THE INVENTION

The present invention relates to the transfer attachment construction of a 4WD vehicle and more particularly to the transfer attachment construction of 4WD vehicles that are based on FF vehicles (Front engine-Front drive).

BACKGROUND OF THE INVENTION

In 4WD vehicles in order to apply the engine's driving power to meet the running requirements, there exists, as power transmitters, a transmission, a differential, and, a transfer to distribute the driving power from the transmission.

However, in the case of 4WD vehicles that are based on FF vehicles (Front engine-Front drive), the transmission and differential are of one piece, and to the differential is connected a drive wheel axle. On top of the drive wheel axle is attached an independently formed transfer.

In the case of a transfer 102, as shown in FIGS. 20 and 21, a retainer 108 is included and is attached to the rear of the transfer case 106 by retainer attachment bolts in the direction of transfer pinion axle center C at the rear of the vehicle and supported by the transfer pinion axle (not shown) which runs lengthwise of the vehicle, namely, at top right, retainer attachment bolt NO. 1 (104-1), at bottom right, retainer attachment bolt NO. 2 (104-2) at top left, retainer attachment bolt NO. 3 (104-3), and at bottom left, retainer attachment bolt NO. 4 (104-4)(not shown). Also, protruding at the right of retainer 108 is the top right NO. 1 bracket attachment boss 110-1 and the bottom right NO. 2 bracket attachment boss 110-2, to which is attached the mount bracket 114 by mount attachment bolt NO. 1 (112-1) and by mount attachment bolt NO. 2 ( 112-2) in an almost perpendicular orientation to transfer pinion axle center C. The mount bracket forms an S shaped space which supports a mount (not shown), and comprises NO. 1 and NO. 2 bolt supporting bosses 118-1 and 118-2 which contain NO. 1 and NO. 2 bracket attachment bolt holes 116-1 and 116-2 (not shown) through which must pass NO. 1 and NO. 2 bracket attachment bolts 112-1 and 112-2. It also comprises a first attachment section 120, which is located at the right side of retainer 108, and an opposite attachment section 122, which is located in opposition to the first attachment section 120 and set apart from the right side of retainer 108. At the tips of both attachment sections are mount supporting bosses 124 and 126. Also, the first attachment section 120 is attached to another bracket attachment boss, the NO. 3 bracket attachment boss 128, which is formed at the rear of retainer 108. The first attachment section 120 is attached to the No. 3 bracket attachment boss 128 by the NO. 3 bracket attachment bolt 130. In this case, as shown in FIG. 21, the center lines M1 and M2 of NO. 1 and NO. 2 bracket attachment bosses 110-1 and 110-2 are at distances E1 and E2 from the transfer pinion axle center C, and also, at transfer pinion axle center C, overlap the head sections of NO. 1 and NO. 2 retainer attachment bolts 104-1 and 104-2.

Further, as shown in FIGS. 22 and 23, in the case of a transfer 202, a retainer 208 is included, and is attached to the rear of the transfer case 206 by retainer attachment bolts, in a rearward direction from transfer pinion axle center C and supported by the transfer pinion axle (not shown) which runs lengthwise of the vehicle, namely, at top right, retainer attachment bolt NO. 1 (204-1), at bottom right, retainer attachment bolt NO. 2 (204-2), at top left, retainer attachment bolt NO. 3 (204-3), and at bottom left, retainer attachment bolt NO. 4 (204-4)(not shown). Also, a one piece mount bracket 216 is formed to the right side of retainer 208 and comprises supporting boss 210, first attachment section 212 and opposite attachment section 214.

Examples of this kind of transfer construction are disclosed in published Japanese Patent Application Laid-Open No. 10-291426 and Japanese Patent Application Laid-Open No. 10-203190. In Japanese Patent Application Laid-Open No. 10-291426, an extension housing is connected to the transfer case, and also, in the cylindrically shaped rotating body, a lubricating oil passage is formed that connects with the extreme section on the transfer side In Japanese Patent Application Laid-Open No 10-203190, a lubricating oil groove is formed on the inner side of the transfer case and a mound is formed on one of the ball bearings in the spacer.

However, it has conventionally been the case that in a transfer as shown in FIGS. 20 and 21 the NO. 1 and NO. 2 bracket attachment bosses in the direction of the transfer pinion center overlap with the NO. 1 and NO. 2 bracket retainer attachment bolt heads. In such a case, when attaching the retainer to the transfer case the NO. 1 and NO. 2 retainer attachment bolts interfere with the NO. 1 and NO. 2 bracket attachment bosses, making it difficult to tighten the NO. 1 and NO. 2 retainer attachment bolts and thereby decreasing assembly efficiency as well as the coupling reliability of the retainer and mount bracket.

Also, in a transfer as shown in FIGS. 22 and 23, as the retainer and mount bracket are formed of a single piece, the construction of the complete retainer is complicated and the manufacture is made difficult. Furthermore, yield is decreased and manufacture is expensive.

SUMMARY OF THE INVENTION

Therefore, in order to eliminate the above-described disadvantages in the transfer attachment construction of a 4WD vehicle, the present invention is characterized by the retainer being attached to a transfer case by retainer attachment bolts in line with the center of a transfer pinion axle where the transfer pinion axle is disposed in a front-to-rear direction of the vehicle, by the retainer including a bracket attachment boss to which a mount bracket is attached by bracket attachment bolts and at an almost perpendicular orientation to the transfer pinion axis, and by the retainer attachment bolts being prevented from interfering with the bracket attachment boss by disposing the bracket attachment boss close enough to the transfer pinion axle to avoid overlapping between the bracket attachment boss and the retainer attachment bolts as the bolts are screwed into the transfer case in a direction in line with the transfer pinion axle.

According to the present invention, in order to prevent the retainer attachment bolts from interfering with multiple bracket attachment bosses, the bracket attachment bosses are disposed close enough to the transfer pinion axle to thereby avoid overlapping between the bracket attachment bosses and the retainer attachment bolts. By this means, when attaching the retainer to the transfer case, the retainer attachment bolts will not interfere with the bracket attachment bosses, the retainer attachment bolts are easier to tighten, thus increasing ease of assembly, and the coupling of the retainer and mount bracket is improved. To this same end, retainer construction design is simplified, making for ease of manufacture; also, yield is increased, and construction costs are lessened.

DESCRIPTION OF THE DRAWINGS

FIG. 22 is a plan view of a mount bracket as conventionally attached using integrally constructed parts.

FIG. 23 is a side view of a retainer as indicated by arrow 23 in FIG. 22.

DETAILED DESCRIPTION OF THE INVENTION

Figure 17:
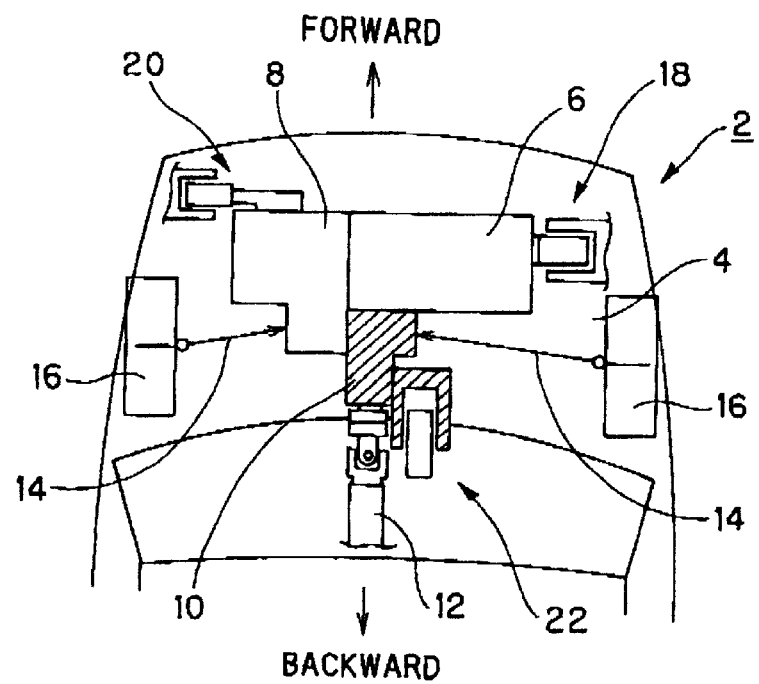
FIG. 17 is a plan view of a section of a vehicle.

The embodiments of the present invention will now be described in detail and concretely according to the drawings. FIGS. 1 through 17 show a first embodiment of the invention. In FIG. 17, reference numeral 2 designates a 4WD vehicle (Four Wheel Drive vehicle) based on an FF vehicle (Front Engine, Front Drive vehicle) [referred to hereafter as vehicle], reference numeral 4 designates the engine room, reference numeral 6 designates the engine, reference numeral 8 designates the transmission, reference numeral 10 designates the transfer, reference numeral 12 designates the propeller shaft, reference numerals 14 designate the front axles, and reference numerals 16 designate the front wheels.

Engine 6, transmission 8, and transfer 10 are integrally connected and are given resilient support within the vehicle (not shown) by the engine side mount supporting section 18, transmission side mount supporting section 20, and the transfer side mount supporting section 22. Also, the transfer 10 is separately attached to the transmission 8.

In transfer 10, as shown in FIGS. 12, 13, 14, 15, 16, the retainer 26 is attached to the transfer case 24. Also, the drive wheel axle 28 that is connected to the differential gear section (not shown) of the transmission 8 is supported by the transfer case 24. Furthermore, the ring-shaped transfer power input axle 30 is loosely fastened around the drive wheel axle 28. One end of this transfer power input axle 30 is connected with the differential case (not shown). At the approximate center of said transfer power input axle 30, a transfer power input gear 32 is integrally formed. Also, in support of the transfer case 24, there is a transfer counter axle 34 running approximately parallel to the transfer power input axle 30. In the construction of this transfer counter axle 34 there is included transfer counter gear 36, which meshes with the transfer power input gear 32. Also, in the transfer counter axle 34, there is a transfer bevel gear 38, which is positioned in a row with the transfer power gear 36. The transfer bevel gear 38 is connected to the transfer counter axle 34 in spline fashion and is also attached to the transfer counter axle 34 by an affixing nut 40 screwed onto the transfer counter axle 34.

As for the retainer 26, it is supported by the transfer pinion axle 42, which is disposed in a front to rear direction of the vehicle 2. The transfer pinion axle 42 includes a transfer pinion gear (bevel pinion) 44, which meshes with transfer bevel gear 38. The transfer pinion axle 42 serves as the transfer exit.

The retainer 26 is connected to the rear of transfer case 24 using the retainer attachment bolt holes located on the rim of the front retainer attachment flange 46, namely the upper right NO. 1 retainer attachment bolt hole 48-1, the lower right NO. 2 retainer attachment bolt hole 48-2, the upper left NO. 3 retainer attachment bolt hole 48-3, and the lower left NO. 4 retainer attachment bolt hole 48-4. Through the retainer attachment bolt holes are passed retainer attachment bolts from the rear of the vehicle 2 and oriented to the transfer pinion axle 42 having center C. Namely, the upper right NO. 1 retainer attachment bolt 50-1, the lower right NO. 2 retainer attachment bolt 50-2, the upper left NO. 3 retainer attachment bolt hole 50-3, and the lower left NO. 4 retainer attachment bolt hole 50-4 are passed through the bolt holes. The retainer attachment bolts NOs. 1–4 (50-1 through 50-4) are then screwed into case attachment holes (not shown) in the NOs. 1–4 case attachment bosses (52-1 through 52-4) at the rear of transfer case 24. At the rear of the retainer 26, there is provided a propeller shaft attachment flange 54.

In the retainer 26, as shown in FIGS. 1 through 4, there are bracket attachment bosses which are at an almost perpendicular orientation to axle center C of transfer pinion axle 42 and which, on their right side, have only length Al protruding, namely, the NO. 1 bracket attachment boss 56-1 and the NO. 2 bracket attachment boss 56-2, which are of an integrated construction. From the extreme right face of NO. 1 bracket attachment boss 56-1 and the NO. 2 bracket attachment boss 56-2, there are bolt screw holes, namely, NOs. 1 and 2 bracket attachment bolt screw holes 58-1 and 58-2, respectively. Also, the center lines M1 and M2, of NOs. 1 and 2 bracket attachment bosses 56-1 and 56-2 are moved closer to the axle center C of transfer pinion axle 42, to a distance of L1 and L2, so that when the NOs. 1 and 2 retainer attachment bolts 50-1 and 50-2 are passed through the NOs. 1 and 2 retainer attachment bolt holes 48-1 and 48-2, the heads of the NOs. 1 and 2 retainer attachment bolts 50-1 and 50-2 avoid interference with the outer surfaces of NO. 1 bracket attachment boss 56-1 and the NO. 2 bracket attachment boss 56-2; and at the same time, the heads of the Nos. 1 and 2 retainer attachment bolts 50-1 and 50-2 are positioned to a distance of B1 and B2 from the center lines M3 and M4 of NOs. 1 and 2 retainer attachment bolt holes 48-1 and 48-2. By this means, in the direction of the axle center c of transfer pinion axle 42, there will be formed an interval or space D1 between the outer surface of NO. 1 bracket attachment boss 56-1 and the outer surface of the head of NO. 1 retainer attachment bolt 50-1, and there will be no overlapping between NO. 1 bracket attachment boss 56-2 and NO. 1 retainer attachment bolt 50-1. Also, there will be formed an interval or space D2 between the outer surface of NO. 2 bracket attachment boss 56-2 and the outer surface of the head of NO. 2 retainer attachment bolt 50-2, and there will be no overlapping between NO. 1 bracket attachment boss 56-2 and NO. 1 retainer attachment bolt 50-2.

Figure 3:
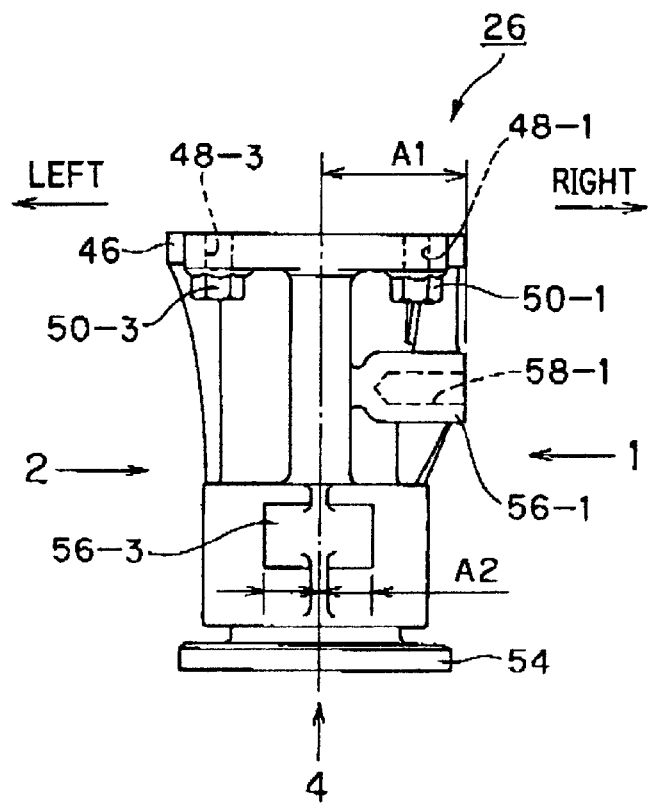
FIG. 3 is a plan view of a retainer.
Figure 4:
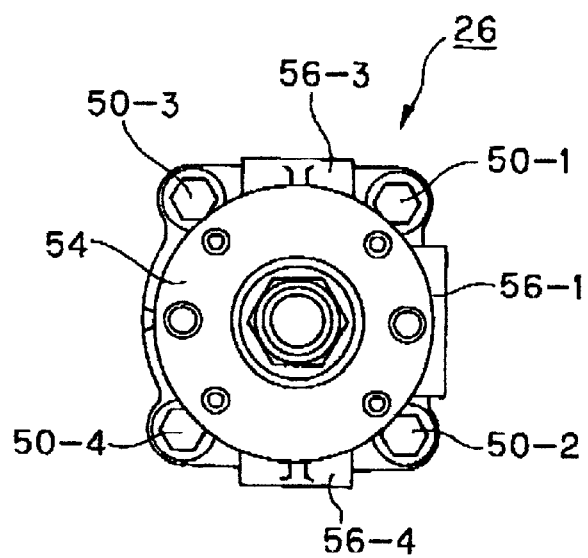
FIG. 4 is a rear view of a retainer as indicated by arrow number 4 in FIG. 3.
Figure 5:
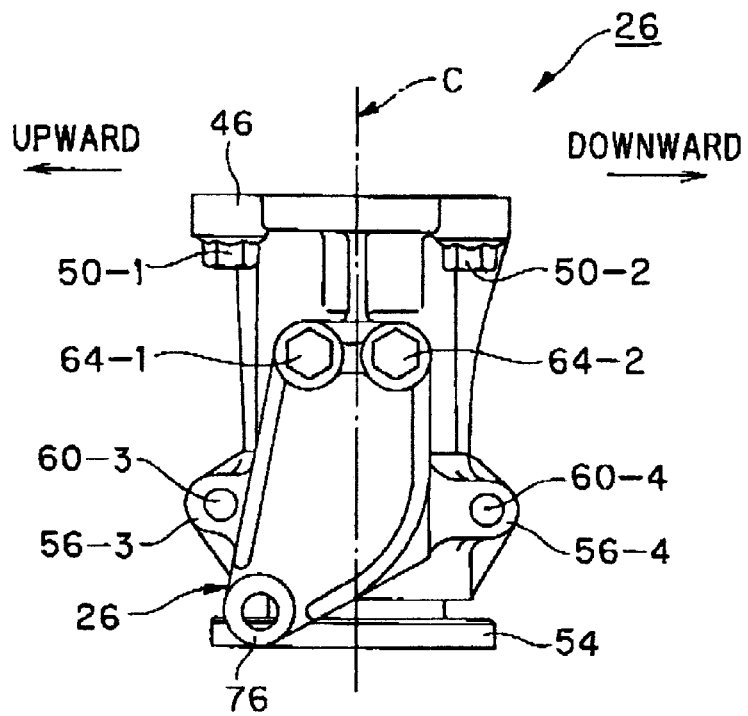
FIG. 5 is a right side view of a retainer to which a mount bracket is attached as indicated by arrow number 5 in FIG. 7.
Figure 6:
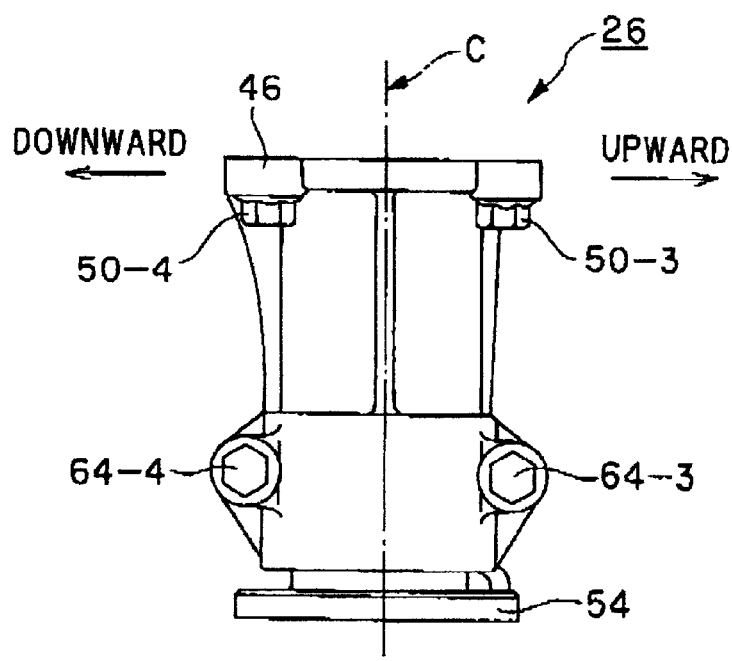
FIG. 6 is a left side view of a retainer to which a mount bracket is attached as indicated by arrow number 6 in FIG. 7.
Figure 7:
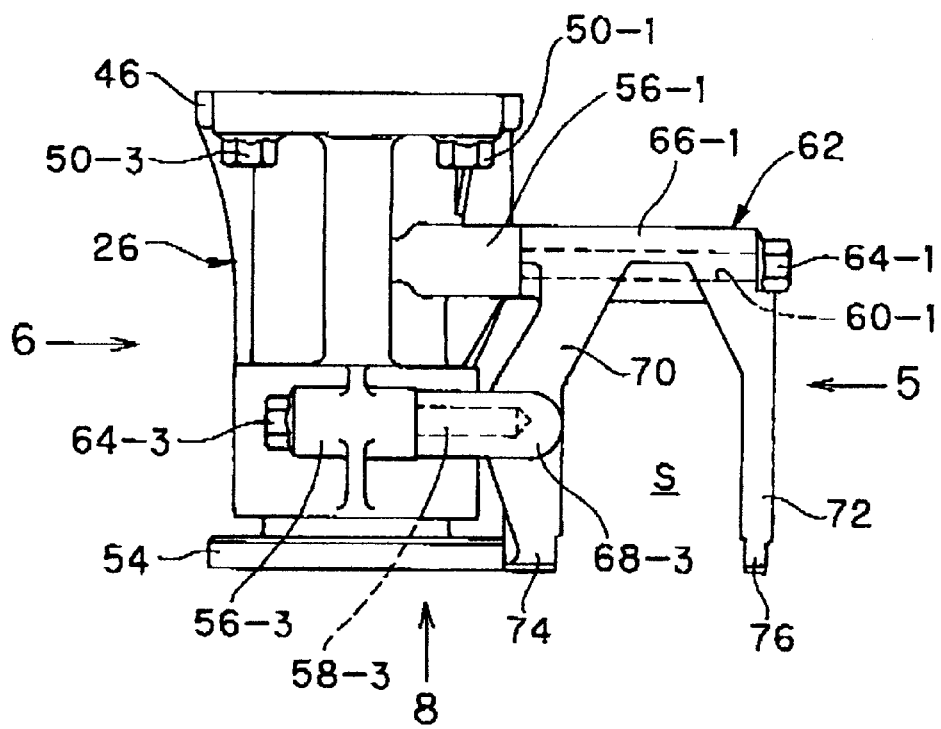
FIG. 7 is a plan view of a retainer to which a mount bracket is attached.
Figure 8:
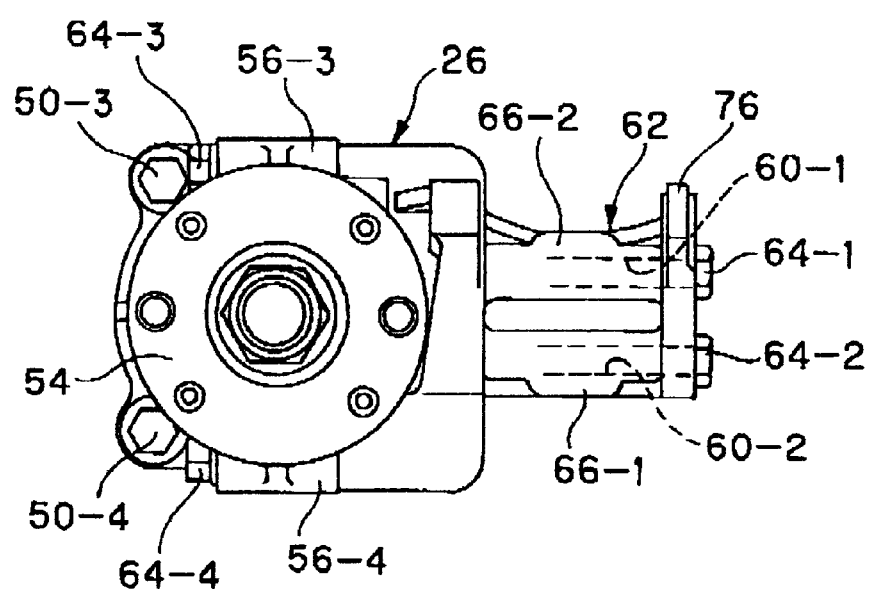
FIG. 8 is a rear view of a retainer to which a mount bracket is attached as indicated by arrow number 8 in FIG. 7.
Figure 9:
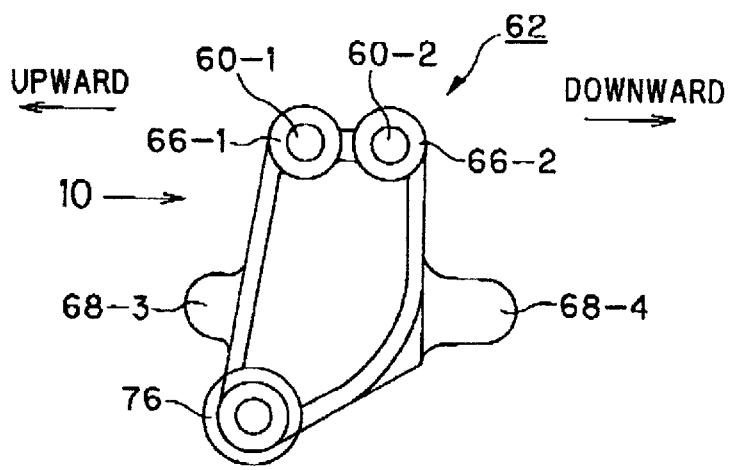
FIG. 9 is a right side view of a mount bracket as indicated by arrow number 9 in FIG. 10.
Figure 10:
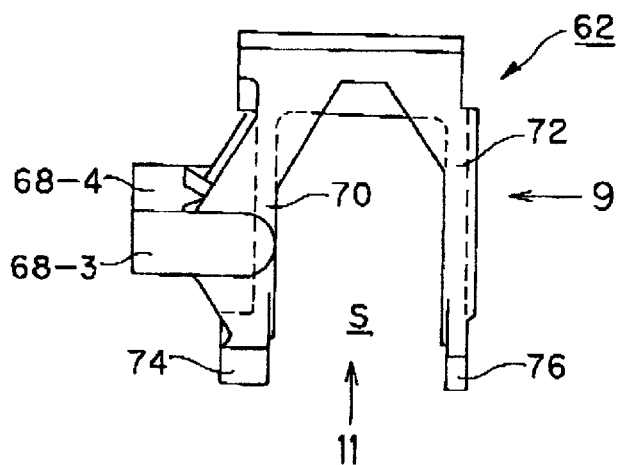
FIG. 10 is a plan view of a mount bracket.
Figure 11:
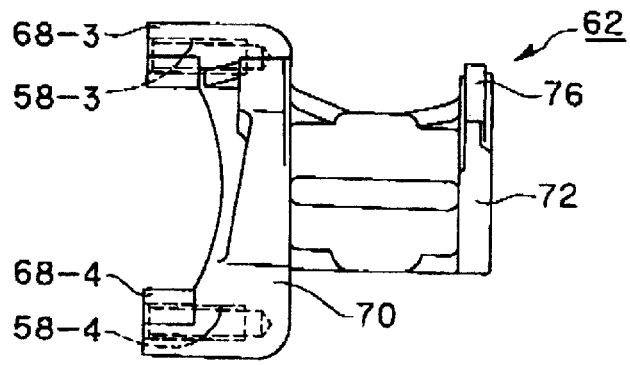
FIG. 11 is a rear view of a mount bracket as indicated by arrow number 11 in FIG. 10.
Figure 12:
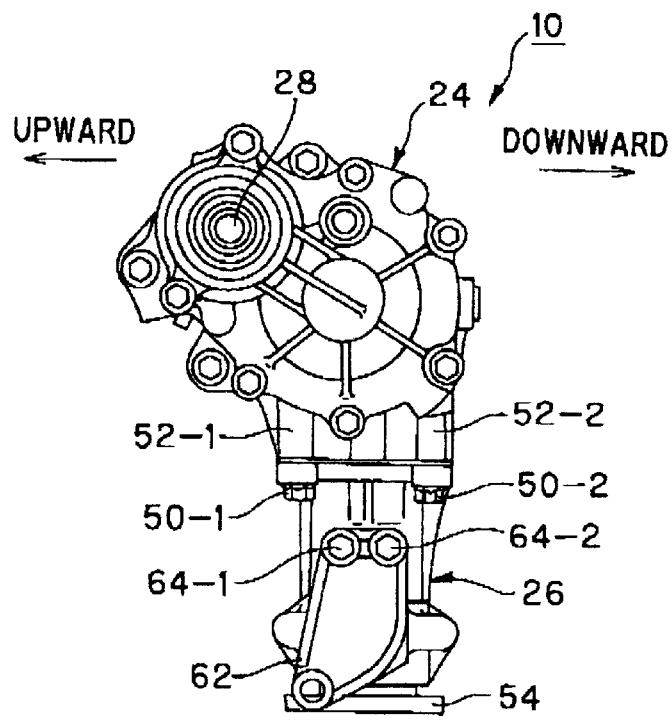
FIG. 12 is a right side view of a transfer as indicated by arrow number 12 in FIG. 14.
Figure 13:
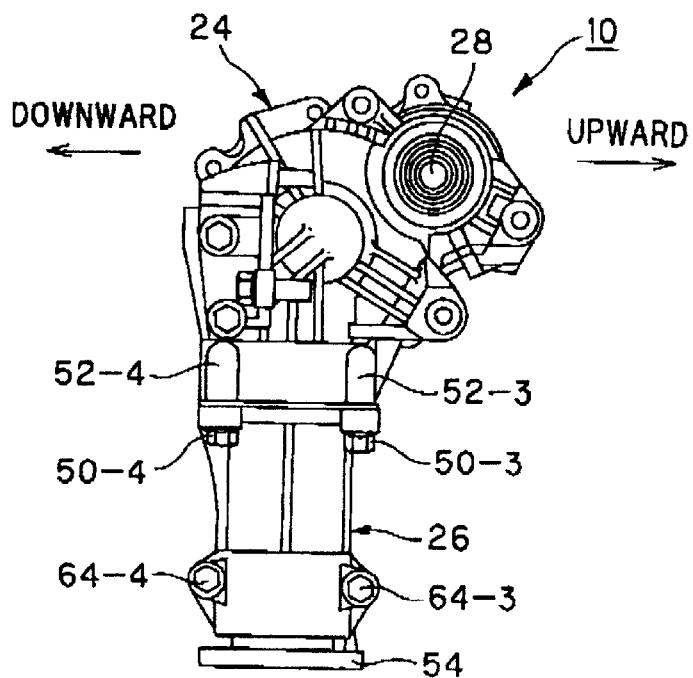
FIG. 13 is a left side view of a transfer as indicated by arrow number 13 in FIG. 14.
Figure 14:
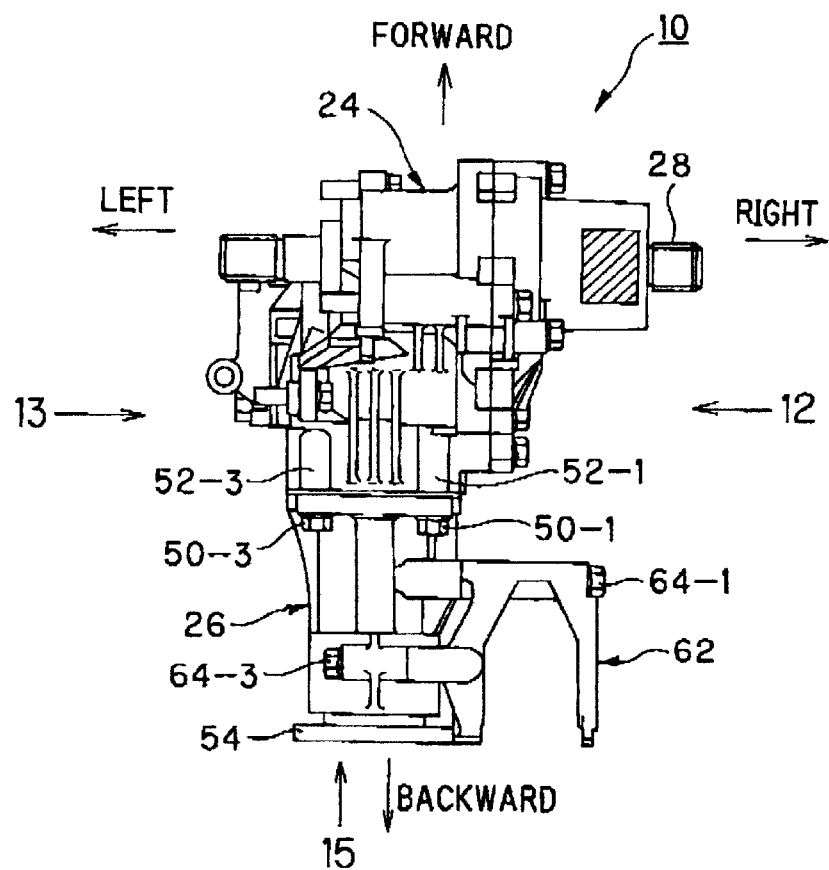
FIG. 14 is a plan view of a transfer.
Figure 15:
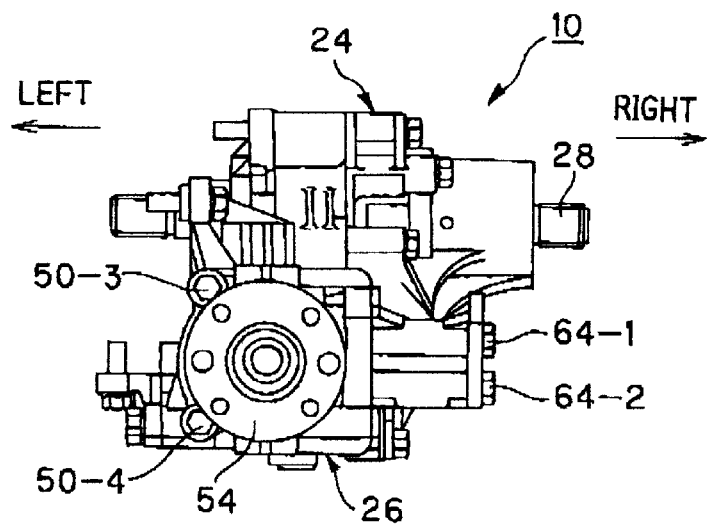
FIG. 15 is a rear view of a transfer as indicated by arrow number 15 in FIG. 14.
Figure 16:
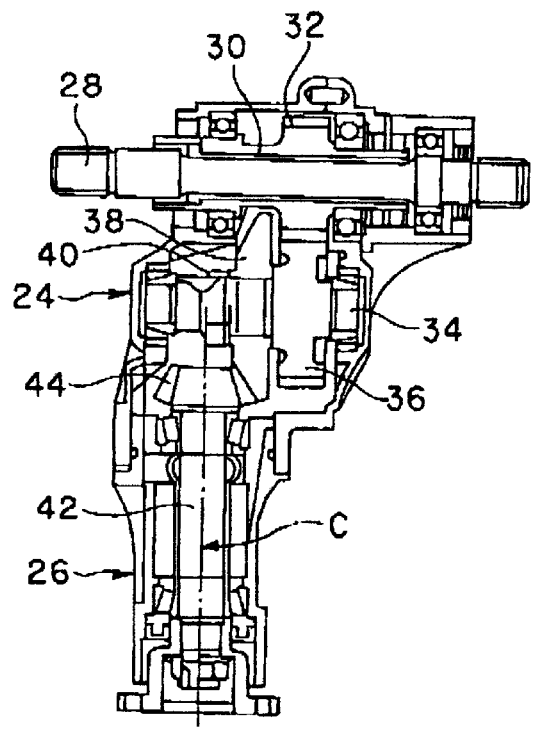
FIG. 16 is a cross-sectional view of a transfer.

Also, in retainer 26, in the same direction as NO. 1 bracket attachment boss 56-1 and NO. 2 bracket attachment boss 56-2, and to a length A2 to the right and left of axle center C of transfer pinion 42, there are formed other bracket attachment bosses, including on the upper side NO. 3 bracket attachment boss 56-3 and on the lower side NO. 4 bracket attachment boss 56-4. NO. 3 bracket attachment boss 56-3 is positioned closer to axis center C of transfer pinion axis 42 to a distance of L3 from the axis center C of transfer pinion axis 42. By this means, when passing NO. 1 and NO. 3 retainer attachment bolts 50-1 and 50-3 through NOs. 1 and 3 retainer attachment bolt holes 48-1 and 48-3 there will be no interference with the heads of the NOs. 1 and 3 retainer attachment bolts 50-1 and 50-3. Also, NO. 4 bracket attachment boss 56-4 is positioned closer to axis center C of transfer pinion axis 42 to a distance of L4 from the axis center C of transfer pinion axis 42. By this means, when passing NO. 2 and NO. 4 retainer attachment bolts 50-2 and 50-4 through NOs. 2 and 4 retainer attachment bolt holes 48-2 and 48-4, there will be no interference with the heads of the NOs. 2 and 4 retainer attachment bolts 50-2 and 50-4. Therefore, as shown in FIGS. 3 and 4, both ends of NO. 3 bracket attachment boss 56-3 are positioned, in the direction of axis center C of transfer pinion axis 42, so as not to overlap the heads of NOs. 1 and 3 retainer attachment bolts 50-1 and 50-3. Also, both ends of NO. 4 bracket attachment boss 56-4 are positioned, so as not to overlap the heads of NOs. 2 and 4 retainer attachment bolts 50-2 and 50-4. NO. 3 bracket attachment bolt hole 60-3 is formed in NO. 3 bracket attachment boss 56-3. NO. 4 bracket attachment bolt hole 60-4 is formed in NO. 4 bracket attachment boss 56-4.

Mount bracket 62, which makes up the transfer side support section 22, is attached to retainer 26. Mount bracket 62, as shown in FIGS. 5–11, forms an S shaped space in support of the mount (not shown), and comprises NO. 1 and NO. 2 bolt supporting bosses 66-1 and 66-2, which contain NO. 1 and NO. 2 bracket attachment bolt holes 60-1 and 60-2, through which must pass NO. 1 and NO. 2 bracket attachment bolts 64-1 and 64-2. Mount bracket 62 also includes a first attachment section 70 located on the right side of the retainer 26, which comprises the NO. 3 and NO. 4 mount attachment bosses 68-3 and 68-4, which include the NO. 3 and NO. 4 bracket attachment bolt screw holes 58-3 and 58-4, into which are screwed the NO. 3 and NO. 4 bracket attachment bolts 64-3 and 64-4. Mount bracket 62 also includes an opposite attachment section 72, which is located in opposition to the first attachment section 70 and set apart from the right side of retainer 26. At the tip of both attachment sections 70 and 72 are the first and opposite mount supporting bosses 74 and 76.

NOs. 1 and 2 bracket attachment bolts 64-1 and 64-2 are those bolts which pass through NOs. 1 and 2 bracket attachment bolt holes 60-1 and 60-2 and are then screwed into NOs. 1 and 2 bracket attachment bolt screw holes 58-1 and 58-2. NOs. 3 and 4 bracket attachment bolts 64-3 and 64-4 are those bolts which pass through NOs. 3 and 4 bracket attachment bolt holes 60-3 and 60-4 and are then, screwed into NOs. 3 and 4 bracket attachment bolts screw holes 58-3 and 58-4.

Next, the operation of the first embodiment will be described.

When attaching retainer 26 to transfer case 24, after passing each retainer attachment bolt 50 through each retainer attachment bolt hole 48 they will be screwed into the case attachment boss 52. Since NOs. 1 and 2 bracket bosses 56-1 and 56-2 are positioned so as not to interfere with NOs. 1 and 2 retainer attachment bolts 50-1 and 50-2, tightening of NOs. 1 and 2 retainer attachment bolts 50-1 and 50-2 is made easier, assembly efficiently improved, and the coupling between mount bracket 62 and retainer 26 also improved.

Also, mount bracket 62 is attached to retainer 26 by screwing NOs. 1 and 2 bracket attachment bolts 64-1 and 64-2 into NOs. 1 and 2 bracket attachment screw bolt holes 58-1 and 58-2 after passing them through NOs. 1 and 2 bracket attachment bolt holes 60-1 and 60-2. Mount bracket 62 is also attached to retainer 26 by screwing NOs. 3 and 4 bracket attachment bolts 64-3 and 64-4 into NOs. 3 and 4 bracket attachment screw bolt holes 58-3 and 58-4 after passing them through NOs. 3 and 4 bracket attachment bolt holes 60-3 and 60-4, in an opposite direction to NOs. 1 and 2 bracket attachment bolts 64-1 and 64-2. Since NOs. 3 and 4 bracket bosses 56-3 and 56-4 are positioned at axle center C of transfer pinion axle 42, assembly efficiency between the mount bracket 62 and retainer 26 is improved.

Moreover, since NOs. 3 and 4 bracket bosses 56-3 and 56-4 are positioned so as not to interfere with NOs. 1 through 4 retainer attachment bolts 50-1 through 50-4, tightening of NOs. 1 through 4 retainer attachment bolts 50-1 through 50-4 is made easier and thus efficiency of assemble is improved.

Furthermore, mount bracket 62 is attached to retainer 26 as a separate construction, so that when compared to a one-piece integrated construction, the construction of retainer 26 is simplified, thus making its manufacture easier, increasing its yield, and reducing its cost.

Figure 18:
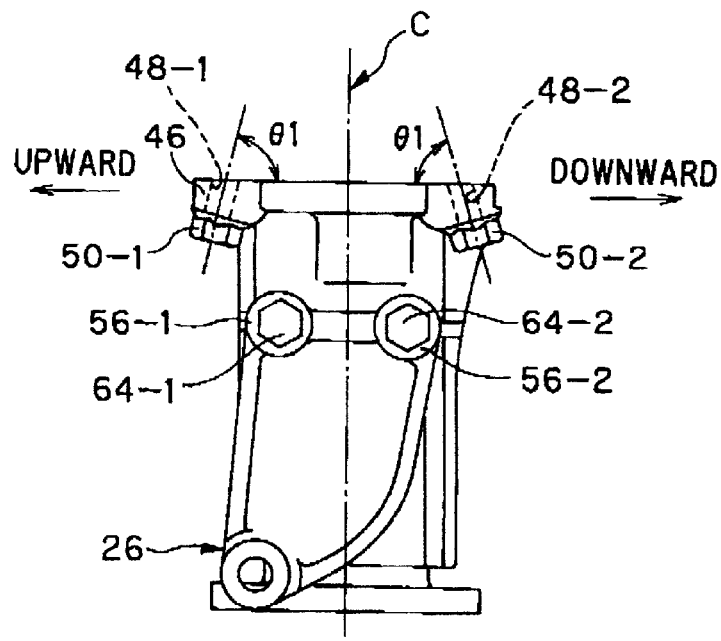
FIG. 18 is a right side view of a retainer according to a second embodiment

FIG. 18 shows a specific constitution of the present invention as a second embodiment of the invention.

In this second embodiment, the same functional parts are designated by the same reference numerals with respect to the first embodiment.

The characteristics of the second embodiment reside in the following points. Taking retainer 26 as representative in shape of conventional retainers, the NO. 1 retainer attachment bolt hole 48-1 and NO. 2 retainer attachment bolt hole 48-2, located in retainer side attachment flange 46, are made to open outwards in a front to rear direction as well as to maintain an angle E$\Theta$1 in relation to the end face of retainer side attachment flange 46.

In this specific second embodiment, however, by changing the angle $\Theta$1 alone of NO. 1 retainer attachment bolt hole 48-1 and NO. 2 retainer attachment bolt hole 48-2, located in retainer side attachment flange 46, other changes become unnecessary and interference between NOs. 1 and 2, retainer attachment bolts 50-1 and 50-2 and NOs. 1 and 2 bracket attachment bosses 56-1 and 56-2 is easily avoided.

Figure 19:
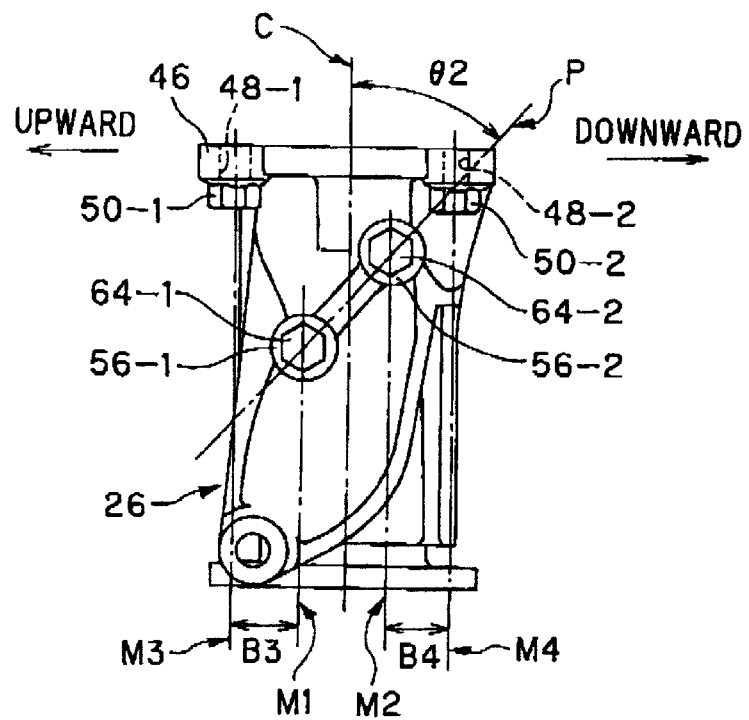
FIG. 19 is a right side view of a retainer according to a third embodiment of the present invention.
Figure 20:
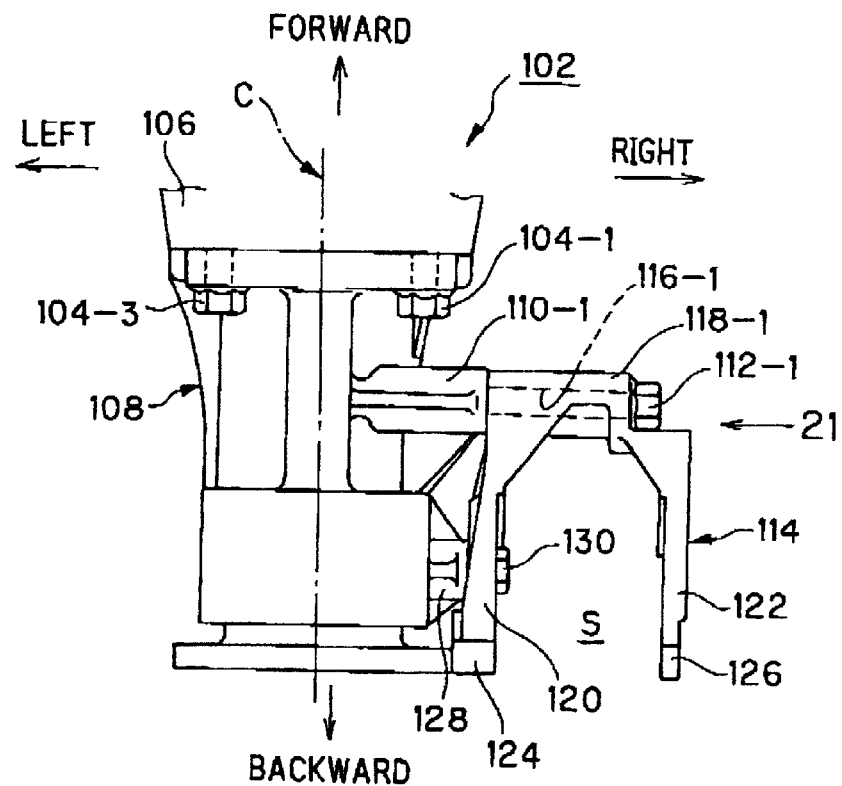
FIG. 20 is a plan view of a mount bracket as conventionally attached using parts of separate construction.
Figure 21:
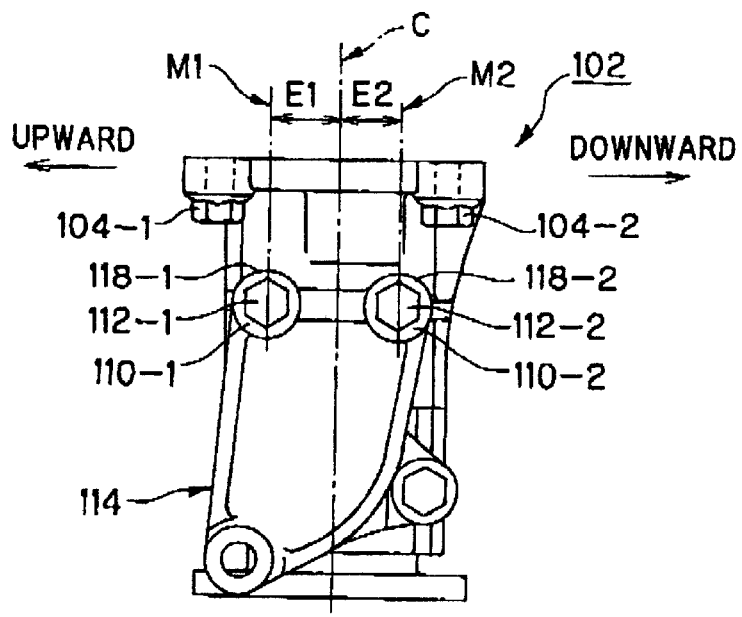
FIG. 21 is a right side view of a retainer as indicated by arrow number 21 in FIG. 20.

FIG. 19 shows a specific constitution of the present invention as a third embodiment of the invention.

The characteristics of the third embodiment reside in the following points. Taking retainer 26 as representative in shape of conventional retainers, NOs. 1 and 2 bracket attachment bosses 56-1 and 56-2, in order to avoid interference with NOs. 1 and 2 retainer attachment bolts 50-1 and 50-2, have inclined their boss center line P to an angle Θ2 in relation to the axle center C of transfer pinion axle 42, and NOs. 1 and 2 bracket attachment bosses 56-1 and 56-2 have positioned their center lines M1 and M2 at a distance of B3 and B4 from the center lines M3 and M4 of NO. 1 retainer attachment bolt hole 48-1 and NO. 2 retainer attachment bolt hole 48-2.

In this specific third embodiment, however, by inclining to an angle Θ2 (in relation to the axle center C of transfer pinion axle 42) the boss center line P that runs through NOs. 1 and 2 bracket attachment bosses 56-1 and 56-2 alone, other changes become unnecessary, construction is simplified, and interference between NOs. 1 and 2 retainer attachment bolts 50-1 and 50-2 and NOs. 1 and 2 bracket attachment bosses 56-1 and 56-2 is easily avoided.

Figure 1:
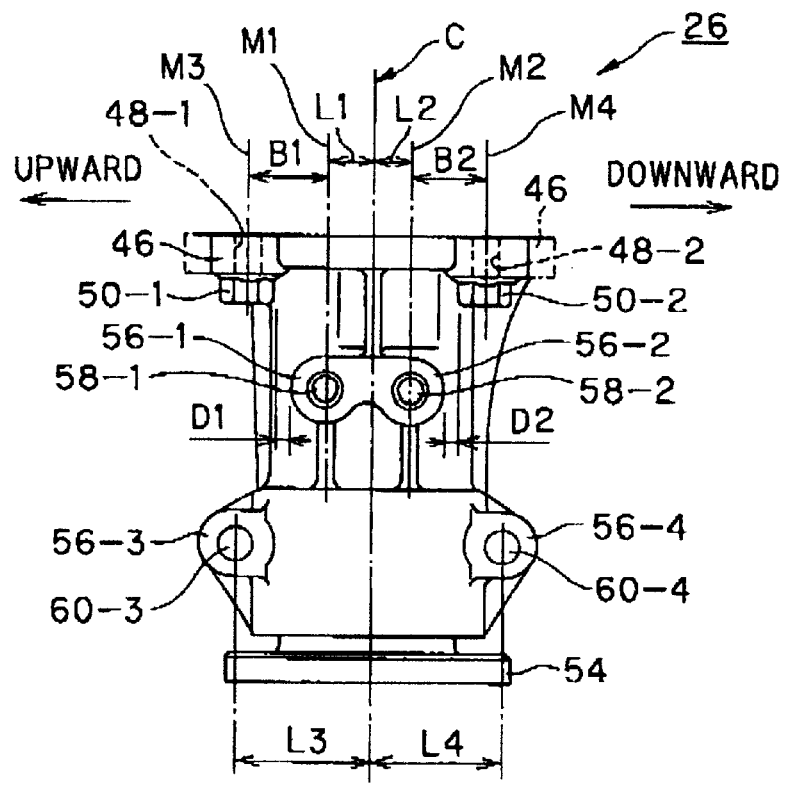
FIG. 1 is a right side view of a retainer as indicated by arrow number one in FIG. 3.
Figure 2:
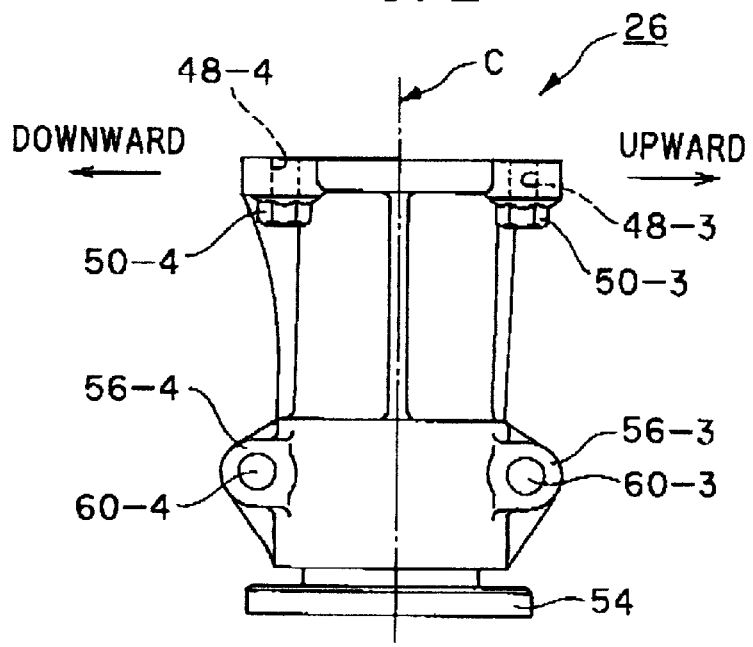
FIG. 2 is a left side view of a retainer as indicated by arrow number 2 in FIG. 3.

Further, in regard to this invention, as shown in FIG. 1, by slightly extending the rim of retainer attachment flange 46 and by constructing retainer attachment bolt hole 48 apart from axle center C of transfer pinion axle 42 it is also possible to place NOs. 1 and 2 retainer attachment bolts 50-1 and 50-2 so as to avoid interference with NOs. 1 and 2 bracket attachment bosses 56-1 and 56-2.

As is clear from the detailed description of the invention, in order to prevent the retainer attachment bolts from interfering with the bracket attachment bosses, the bracket attachment bosses are disposed in line with and closer to the transfer pinion axle center thereby avoiding overlapping between the bracket attachment bosses and the retainer attachment bolts. By this means, when attaching the retainer to the transfer case, the retainer attachment bolts will not interfere with the bracket attachment bosses, the retainer attachment bolts are easier to tighten, thus increasing ease of assembly, and the coupling of the retainer and mount bracket is improved. To this same end, retainer construction design is simplified, making for ease of manufacture; also, yield is improved, and construction costs are lessened.

DESCRIPTION OF THE REFERENCE NUMERALS

2: Vehicle
6: Engine
10: Transfer
24: Transfer case
26: Retainer
42: Transfer pinion axle
50: Retainer attachment bolt
56: Bracket attachment boss
62: Mount bracket

I claim:

1. A transfer attachment construction for a four-wheel drive vehicle, having a retainer (26) attached to a transfer case (24) by retainer attachment bolts (50) and retaining a transfer pinion axle (42) in a longitudinal direction of a vehicle, said transfer pinion axle (42) connected between a transfer (10) and a propeller shaft (12);

a mount bracket (62) attached to said retainer (26) by bracket attachment bolts (64), said mount bracket (62) supporting a mount for attachment to the vehicle;

a retainer side attachment flange (46) abutting on said transfer (10) and being disposed on said retainer (26);

a plurality of retainer attachment bolt holes (48) into each of which a respective retainer attachment bolt (50) is inserted in the direction of the transfer pinion axle (42), said holes (48) being formed on said retainer side attaching flange (46); and a bracket attachment boss (56) for receiving the bracket attachment bolts (64) between adjacent retainer attachment bolt holes (48) in a direction perpendicular to said transfer pinion axle (42) in order to avoid overlapping when said retainer attachment bolts (50) are inserted into said holes (48), said boss (56) being disposed on the retainer (26).

2. The transfer attachment construction of claim 1 wherein said retainer (26) includes a plurality of said bracket attachment bosses (56) and said mount bracket (62) is attached with one of the bracket attachment bosses (56) receiving the bracket attachment bolts (64) in a first direction, and with at least one of the other of said bracket attachment bosses (56) receiving other of the attachment bolts (64) in a second direction opposing to said first direction.

3. The transfer attachment construction of claim wherein said one of the bracket attachment bosses (56) for receiving the bracket attachment bolts (64) in said first direction and said at least one of said other of said bracket attachment bosses (56) for receiving the bracket attachment bolts (64) in said second direction are disposed so as to be located different distances from said transfer pinion axle (42).

* * * * *